United States Patent [19]

Narayan et al.

[11] Patent Number: 5,283,311

[45] Date of Patent: Feb. 1, 1994

[54] FATTY PREPOLYMERS AND FATTY-MODIFIED POLYISOCYANATES AS INTERNAL MOLD RELEASE AGENTS

[75] Inventors: Thirumurti Narayan, Grosse Ile; Anthony Tantillo, Troy; William G. Conger, Grosse Ile, all of Mich.

[73] Assignee: BASF Corporation, Parsippany, N.J.

[21] Appl. No.: 998,969

[22] Filed: Dec. 30, 1992

[51] Int. Cl.⁵ .............................................. C08G 18/10
[52] U.S. Cl. ...................................... 528/49; 528/59; 528/69; 528/70; 528/73; 528/74.5
[58] Field of Search ...................... 528/49, 59, 69, 70, 528/73, 74.5

[56] References Cited

U.S. PATENT DOCUMENTS

| | | |
|---|---|---|
| 3,925,527 | 12/1975 | Kleimann et al. |
| 3,998,766 | 12/1976 | Kan et al. |
| 4,033,912 | 7/1977 | Kleimann et al. |
| 4,201,847 | 5/1980 | Kleimann et al. |
| 4,254,228 | 3/1981 | Kleimann et al. |
| 4,284,730 | 8/1981 | Narayan et al. |
| 4,396,729 | 8/1983 | Dominquez et al. |
| 4,460,801 | 7/1984 | Morel |
| 4,478,893 | 10/1984 | Schönfelder et al. |
| 4,585,803 | 4/1986 | Nelson et al. |
| 4,738,991 | 4/1988 | Narayan |
| 4,743,626 | 5/1988 | Narayan |
| 4,803,229 | 2/1989 | Narayan et al. |
| 4,868,224 | 9/1989 | Harasin et al. |
| 4,895,879 | 1/1990 | Nelson et al. |
| 5,019,317 | 5/1991 | Slocum et al. |
| 5,028,636 | 7/1991 | Gebauer et al. ............... 521/131 |

FOREIGN PATENT DOCUMENTS

0445614A2 9/1991 European Pat. Off.

*Primary Examiner*—Maurice J. Welsh
*Attorney, Agent, or Firm*—Dennis V. Carmen

[57] ABSTRACT

Fatty prepolymers and fatty modidified organic polyisocyantes are provided as internal mold release agents useful in Reaction Injection Molded (RIM) parts. A terminal fatty chain-containing molecule having a primary or secondary hydroxyl group, a primary or secondary amine group, an epoxide group, or an isocyanate group is reacted with an organic aromatic polyisocyanate to yield a fatty prepolymer having a urethane linkage, a urea linkage, or an oxazolidinone linkage; or to yield a fatty modified polyisocyanate having an allophanate linkage, a biuret linkage, or a carbodiimide-uretonimine linkage. The terminal chain on the molecule contains at least 8 branched or unbranched, saturated or unsaturated, hydrogen substituted aliphatic carbon atoms in succession or at least 5 branched or unbranched, aliphatic or cycloaliphatic perfluorinated atoms in succession.

54 Claims, No Drawings

FATTY PREPOLYMERS AND FATTY-MODIFIED POLYISOCYANATES AS INTERNAL MOLD RELEASE AGENTS

FIELD OF THE INVENTION

The present invention relates to a mold release composition comprising fatty isocyanate derivatives, more particularly to producing new fatty prepolymers by reacting a terminal fatty portion containing isocyanate-reactive molecule with an aromatic organic polyisocyanate or modified polyisocyanate, and to producing new modified fatty polyisocyanates by reacting a terminal fatty portion containing isocyanate-reactive molecule with an aromatic organic polyisocyanate under reaction conditions promoting an allophanate linkage, a biuret linkage, or a carbodiimide linkage in the presence of an allophanate promoting catalyst, an optional biuret promoting catalyst, or a carbodiimide promoting catalyst, respectively.

BACKGROUND OF THE INVENTION

Molded noncellular, microcellular, or cellular polyurethane and polyurea parts have found many applications in the automotive and building industries. Such molded parts are typically produced by the RIM process, or can be made be molded by pouring the liquid system into an open mold which is subsequently closed during the foaming reaction. The problem confronted in the RIM method and the open pour method lies in removing the part from the surface of the metal mold. Traditionally, an external mold release agent, such as a silicone-based liquid, is sprayed onto the mold surfaces every time a new part is to be molded. Various efforts are under way to provide for an internal mold release agent contained in the liquid system to reduce or eliminate the need for application of an external mold release agent to the mold surfaces. Examples of such internal mold release compositions are disclosed, for example, in U.S. Pat. Nos. 4,585,803 and 4,895,879, wherein a metal salt of a long chain carboxylic acid, such as zinc stearate is mixed into a polyol using a tertiary amine compatabilizer and preferably having a sterically hindered aromatic diamine chain extender to make a polyurethane or a polyurea molding which releases easily.

Some internal mold release compositions which have met with varying degrees of success are described in U.S. Pat. No. 4,396,729, wherein separate streams of an organic polyisocyanate and an amine terminated high molecular weight polyether, amine terminated chain extender, and a mold release agent, such as a siloxane, are combined in a mold; and, in like fashion, EP 445614 A2 describes reacting a carboxylic acid and a polyether polyol with a polyisocyanate in a closed mold.

Other patents, however, describe the manufacture of certain prepolymers as internal mold release agents. For example, U.S. Pat. Nos. 3,925,527; 4,201,847; 4,254,228; and 4,868,224 describe the reaction between an active hydrogen containing fatty acid ester having a high molecular weight of from 500 to 5,000 and an organic polyisocyanate to produce a prepolymer which is then reacted with a polyether polyol composition to produce a molded product having mold release properties. Prepolymers having mold release properties have also been described in U.S. Pat. Nos. 4,033,912 and 4,478,893, which disclose the reaction between an organic mono- or polyisocyanate and a polysiloxane to yield a mold releasing prepolymer which is then reacted with a polyol composition to produce a molded product which releases from the mold. In another patent describing the use of polysiloxanes, there is dispersed in an organic preferably polyol-modified diisocyanate a siloxane compound whose reactive groups are inhibited by a silicone dispersing or inhibiting agent.

SUMMARY OF THE INVENTION

It is an object of the invention to make a prepolymer having mold releasing properties. It is also an object of the invention to prepare mold releasing prepolymers without the necessity for using metal carboxylates in the polyol composition to obtain mold release.

The objects have been achieved by manufacturing a mold release composition comprising a fatty prepolymer having a terminal fatty chain attached directly or indirectly to a urethane linkage, a urea linkage, or an oxazolidinone linkage; and a fatty modified polyisocyanate having a terminal fatty chain attached directly or indirectly to an allophanate linkage, a biuret linkage, or a uretonimine-carbodiimide linkage; wherein, when said linkage is a urethane linkage or an allophanate linkage, the fatty prepolymer or fatty modified polyisocyanate, respectively, is obtained by reacting an organic polyisocyanate with a terminal fatty chain-containing molecule having an isocyanate-reactive functionality-selected from the group consisting of a primary hydroxyl functionality, a secondary hydroxyl functionality; wherein when said linkage is an oxazolidinone linkage, the fatty prepolymer is obtained by reacting an organic polyisocyanate with a terminal fatty chain molecule having an epoxide functionality; wherein, when said linkage is a urea linkage or a biuret linkage, the fatty prepolymer or fatty modified polyisocyanate, respectively, is obtained by reacting an organic polyisocyanate with a terminal fatty chain-containing molecule having a primary amine or a secondary amine functionality; wherein, when said linkage is a uretonimine-carbodiimide linkage, the fatty modified polyisocyanate is obtained by reacting an organic polyisocyanate with a terminal fatty chain-containing molecule having one isocyanate group; the terminal fatty chain in each case comprising from 8 to 24 hydrogen substituted, branched or unbranched aliphatic carbon atoms in succession or optionally 5 to 24 perfluorinated branched or unbranched carbon atoms in succession, the terminal fatty chain-containing molecule having a molecular weight of less than 500.

DETAILED DESCRIPTION OF THE INVENTION

The mold release composition of the invention comprises modifying an organic polyisocyanate with a terminal fatty chain-containing molecule to obtain what are termed herein as either a fatty prepolymer or a fatty modified organic polyisocyanate. In the case of a fatty prepolymer, a terminal fatty chain-containing molecule having a hydroxyl, amine, or epoxide functionality is reacted with an organic polyisocyanate to obtain urethane, urea, or oxazolidinone linkages, respectively. In the case of a fatty modified polyisocyanate, the same fatty molecule is reacted with an organic polyisocyanate under certain reaction conditions to obtain allophanate or biuret linkages; or in the case of a carbodiimide-uretonimine linkage, a fatty molecule having an isocyanate is catalytically reacted with an organic polyisocyanate.

The term "mold release composition" is broadly meant to include the manufacture of a mold release additive concentrate which may then be blended into the desired organic polyisocyanate to make a final organic polyisocyanate having mold release properties; or means reacting in situ a small amount of fatty molecule with a large quantity of the desired organic polyisocyanate to produce a final organic polyisocyanate having mold release properties in one step without the necessity of blending. Thus, the batch of organic polyisocyanate used to make a RIM part can be blended with a prepolymer or fatty modified polyisocyanate mold release additive of the invention, or may be reacted in situ with the fatty molecule. The final organic polyisocyanate having mold release properties may then be reacted with resin components comprising polyol and chain extender to make a releasable RIM part.

The terminal fatty chain-containing molecule used in the invention will now be described in detail, after which a description of the fatty prepolymers and the fatty modified polyisocyanates will follow. The terminal fatty chain-containing molecule has a relatively low molecular of less than 500, preferably 400 or less, more preferably 300 or less, most preferably 250 or less. The molecule has a terminal fatty chain and either an isocyanate-reactive functionality or an isocyanate functionality. The terminal fatty chain has from 8 to 24 hydrogen aliphatic carbon atoms in succession, preferably 8 to 18 hydrogen substituted carbon atoms in succession, more preferably 10 to 18 hydrogen substituted aliphatic carbon atoms in succession; or 5 to 24 perfluorinated carbon atoms, preferably 5 to 18 perfluorinated carbon atoms, more preferably 5 to 10 perfluorinated carbon atoms in succession, which may be aliphatic or cycloaliphatic. The terminal fatty chain is unreactive towards the isocyanate functionality on the organic polyisocyanate compound and does not contain on at least eight (8) of the terminal aliphatic carbons, or five (5) of the terminal perfluorinated carbons, any groups which would react with an isocyanate functionality in the absence of a catalyst at temperatures of 180° C. or less. Thus, the reaction product of the organic polyisocyanate and the terminal fatty chain-containing molecule will have a pendant fatty chain which imparts mold release to the RIM part.

The terminal fatty chain may contain one or more branching points. The branches preferably consist only of straight chain alkyls of no greater than 3 carbons to which are bonded only hydrogen atoms with the total number of branched carbons not exceeding one (1) per two (2) terminal fatty chain carbons above the minimum number of eight (8) fatty chain carbons required or the five (5) perfluorinated carbons, as the case may be, preferably not to exceed more than one per three terminal fatty chain carbons beyond the minimum number of terminal carbons herein. For example, a terminal fatty chain having only eight carbons will have no branching, while a chain with ten fatty carbons may contain a methyl branch, and a chain with 14 fatty carbons may have a propyl branch, or a methy and ethyl branch, or three methyl branches, the branches being positioned at any location along the terminal chain. However, to optimize the fatty character of the chain, it is preferred that the terminal fatty chain be unbranched.

The fatty molecule may be saturated or unsaturated. The unsaturation may comprise a double bond or triple bond, but is preferably a double bond. More than one point of unsaturation may exist on the fatty molecule, and included within the scope of the invention are dienes, trienes, tetraenes, pentaenes, and hexenes.

The terminal fatty chain-containing molecule has one or more, preferably only one, isocyanate-reactive functionality or an isocyanate functionality which can react with the isocyanate group on the organic polyisocyanate. The particular functionality on the fatty molecule will depend on the linkage one desires to make. In particular, on the fatty molecule is a primary hydroxyl or a secondary hydroxyl, preferably one primary hydroxyl functionality reacting to form a urethane or an allophanate linkage; a primary amine, preferably one primary amine, located on the fatty molecule which reacts to form a urea or a biuret linkage; an epoxide group, preferably one alpha epoxide group on the fatty molecule reacting to form an oxazolidinone linkage; or an isocyanate group, preferably one isocyanate group, located on the fatty molecule to react forming a carbodiimide-uretonimine linkage. The amine, hydroxyl, epoxide, or isocyanate functionalities may be located anywhere on the fatty molecule so long as a terminal fatty chain of at least 8 hydrogen substituted aliphatic carbon atoms in succession, or at least 5 perfluorinated carbon atoms in succession, are free of such functionalities. By a terminal fatty chain is meant that one end of the fatty molecule is terminated with at least 8 hydrogen substituted aliphatic carbon atoms in succession or at least 5 perfluorinated carbon atoms in succession.

Any number of methylene, sulfur, sulfonamide, or ether groups may be located beyond the terminal fatty chain in the fatty molecule, so long as the molecular weight of the molecule is less than 500. Although the fatty molecule may contain more than one hydroxyl, amine, epoxide, isocyanate functionality, or mixtures thereof, it is preferred that only one type and number of these functionalities appear in the molecule.

The terminal fatty chain-containing molecule may be made up of a single species selected from 8 to 24 hydrogen substituted aliphatic carbon atoms, or 5 to 24 perfluorinated carbon atoms, or may be made of a mixture of various chain lengths and molecular weights, including mixtures of saturated and unsaturated species. Most commercially available terminal fatty chain-containing molecules are comprised of a distribution of mixed species, with one species being predominant. As long as the predominant species in a mixture is within the above description of the terminal fatty chain-containing molecules, the mixture as a whole is deemed to fall within the scope of the invention although it is preferred that all species in the mixture are within the specified range of carbon atoms.

Suitable terminal fatty chain-containing molecules having an amine functionality are those that may be derived from saturated or unsaturated fatty acids, such as octanoic acid; 2-octenoic acid; monanoic (pelargonic) acid; 2-monenoic acid; trans and cis 4-decanoic acid; 9-decenoic acid; 2,4-decadienoic acid; undecanoic acid; 10-undecenoic acid; dodecanoic (lauric) acid; 3-dodecenoic acid; 2,4-dodecadienoic acid; tridecanoic acid; tridecenoic acid; tetradecanoic (myristic) acid; 9-tetradecenoic acid; pentadecanoic acid; pentadecenoic acid; hexadecanoic (palmitic) acid; trans-9-hexadecenoic acid; 6,10,14-hexadecatrienoic acid; heptadecanoic (margaric) acid; 9-heptadecenoic acid; octadecanoic (stearic) acid; cis and trans-6-octadecenoic acid; cis-9-octadecenoic (oleic) acid; trans-9-octadecenoic acid; cis and trans-11-octadecenoic acid; cis-9, cis-12-octadecadienoic (linoleic) acid; trans-9, trans-12-octadecadienoic (linolelaidic) acid; cis-9, cis-12, cis-15-octadecatrienoic (linolenic) acid; cis-9, trans-11, trans-13 octadecatrienoic (α-eleostearic) acid; trans-9, trans-11, trans-13-octadecatrienoic (β-eleostearic) acid; cis-9, cis-11, trans-13-octadecatrienoic (punicic) acid; trans-9, trans-12, trans-15-octadecatrienoic (linolenelaidic) acid; 4,8,12,15-octadecatetraenoic (moroctic) acid; 9,11,13,15-octadecatetraenoic (α-parinaric) acid; 9,11,13,15-octadecatetraenoic (β-parinaric) acid; 9,10-dihydroxyoctadecanoic acid; 8-hydroxy-trans-11-octadecene-9-ynoic (ximenyhnolic) acid; malvalic (helphenic) acid; sterculic acid; monadecanoic acid; eicosanoic (arachidic) acid; cis-9-eicosenoic acid, 5,8,11,14-eicosatetraenoic (arachidonic) acid; docosanoic (behenic) acid; cis-11-docosenoic (cetoleic) acid; cis-13-docosenoic (erucic) acid; trans-13-docosenoic (brassidic) acid, 4,8,12,15,19-docosapentaenoic (clupanodonic) acid; tetracosanoic (lignoceric) acid, cis-1-tetracosenoic (selacholeic) acid. Preferred fatty carboxylic acids are lauric, myristic, palmitic, stearic, oleic, linoleic, linolenic, arachidic, behenic, octanoic, decanoic, and mixtures thereof. Commercially available terminal fatty chain-containing molecules having primary amine functionalities derived from several of the aforementioned fatty carboxylic acids are known as Kemamine ® fatty amines marketed by Witco Chemical Corporation.

Other suitable fatty molecules having amine functionalities within the scope of the invention possess an ether group and may be represented by the general formula:

$$R-[O-R^1]_n-NH_2$$

where R is the same as the terminal fatty chain described above, $R^1$ is an alkyl of 2 to 6 carbon atoms, preferably 2 to 3 carbon atoms, and n is from 1 to as many repeating units as desired so long as the molecular weight of the molecule remains under 500. Commercially available fatty alkyl ether primary amines are commercially available, for example, from Sherex Chemical Company under the name of Adogen ® primary ether amines, having the formula:

$$R-O-CH_2CH_2CH_2-NH_2,$$

where R is an 8 to 15 carbon atom alkyl chain, preferably a mixed $C_{12-15}$ atom chain.

The terminal fatty chain-containing molecules containing primary or secondary hydroxyl functionalities are those derived naturally from natural fats, waxes, oils, or those produced synthetically as by, for example, the oxo process.

Suitable fatty alcohols comprise any of the aforementioned carboxylic acids whose carboxylic acid group is replaced with a hydroxyl functionality by, for example, hydrogenolysis process. Examples of primary fatty alcohols are 1-octanol, 1-decanol, 1-undecanol, 1-dodecanol, 1-tetradecanol, 1-hexadecanol, 1-octadecanol, 16-methylheptadecanol (isotearyl alcohol), eicosanol, 18-methylnonadecanol, 18-methyleicosanol, mixtures thereof, and so forth, spanning the range of 8 to 24 carbons; the unsaturated fatty alcohols such as nonenol, decenol, isodecenol, hendecenol, dodecenol, physeteryl alcohol, pentadecenol, isopentadecenol, 9-hexadecen-1-ol (zöömaryl alcohol), cis-9-octodecenol, 9-12-octadecen-1-dienol, eicosenol, docosenol, erucyl alcohol, carnaubenol, mixtures thereof, and mixtures of the saturated alcohols with the unsaturated alcohols.

The fatty alcohols may contain more than one primary hydroxyl group and/or one or more secondary hydroxyl groups beyond the minimum 8 hydrogen substituted terminal chain or 5 perfluorinated terminal carbon chain. Examples are chimyl alcohol, batyl alcohol, selachyl alcohol, 9-hydroxy-12-octadecenol, and 9,10-dihydroxyoctadecanol. Other groups beyond the terminal chain in the fatty alcohol may be ether, ester, amide, sulfonamide, and ketone.

Fatty alcohols containing only one or more secondary hydroxyl groups as the functionality to react with the isocyanate functionality on the polyisocyanate are also within the scope of the invention. One example of such an alcohol is described in U.S. Pat. No. 4,460,801, incorporated herein by reference wherein are described hexadeca-1,6,10,15-tetrane-3-ol, tetracosa-1,6,10,14,18,23-hexane-3-ol, or the saturated forms thereof.

The terminal fatty chain-containing molecules employed in the invention may contain one or more fatty terminal chains. For example, the fatty molecule may contain a second branched 8 to 24 straight chain alkyl located at a point beyond the minimum carbon chain length of the original terminal fatty chain.

The terminal fatty chain-containing molecule may contain an epoxide functionality, preferably an alpha-epoxide group. Suitable examples are the fatty alpha-epoxides of an 8 to 24 hydrogen substituted aliphatic carbon chains mentioned above in connection with the fatty carboxylic acids. The fatty molecule may also be epoxidized at any point of unsaturation in a fatty molecule beyond 8 aliphatic hydrogen substituted carbon atoms to yield a two-substituted epoxide group. Thus, the fatty epoxide may be of the formula:

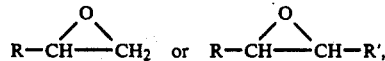

where R is at least the minimum stated fatty carbon chain length, and R' may be a 1 to 24 carbon alkyl radical, polyoxyethylene radical, or polyoxypropylene radical. Commercially available alpha-epoxides may be sold pure or as blends. Examples of commercially available blends of various chain length alpha-epoxides are sold under the name VIKOLOX by Viking Chemical Company.

These fatty epoxides may also be employed as intermediates in the manufacture of a multi-fatty chain-containing molecule having a secondary hydroxyl group, which secondary hydroxyl may then react with the polyisocyanate compound. For example, one mole of a fatty alpha-epoxide may be made to react with one mole of a fatty alcohol to yield the following structure:

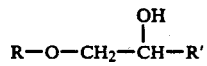

where R' is the fatty epoxide residue and R is the fatty alcohol residue, each having at least the minimum chain length as terminal fatty chains. Optionally, only one of R or $R^1$ need have the minimum terminal chain length while the other may be a polyoxyethylene or a polyoxypropylene group.

Instead of reacting an alpha-epoxide with a fatty alcohol, one may react a two-substituted fatty epoxide with an alcohol, preferably a fatty alcohol, to obtain a tri-chain fatty epoxide having a secondary hydroxyl group:

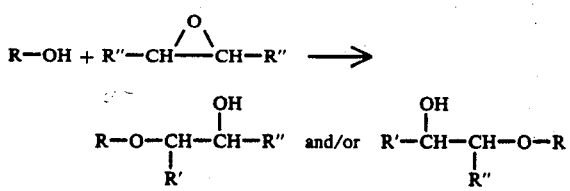

wherein R is the fatty alcohol residue and R" and R" are the fatty epoxide residue.

When the hydroxyl group of the two- or three-chained fatty molecule is made to react with the isocyanate functionality to form a urethane linkage, one obtains a polyisocyanate having two or three pendant fatty chains to act as mold release agents.

The fatty molecule used in the invention may contain, as the terminal fatty chain, a perfluorinated chain of from 5 to 24 carbon atoms in succession preferably 5 to 18 perfluorinated carbon atoms, more preferably 6 to 8 perfluorinated carbon atoms. Unlike the hydrogen substituted aliphatic carbon chain, the perfluorinated carbon chain may be cycloaliphatic as well as straight chained. The perfluorinated fatty molecules may have any one of the above-stated isocyanate-reactive functionalities, such as a primary or secondary hydroxyl group, a primary amine, an epoxide, or an isocyanate, but preferably has a primary hydroxyl group. Commercially available perfluorinated molecules are sold by 3M Industrial Chemicals as fluorochemical intermediates.

The foregoing fatty molecules are made to react with a polyisocyanate to form urethane, urea, oxazolidinone, allophanate, biuret, or uretonimine-carbodiimide linkages. The first three mentioned linkages form a fatty prepolymer, while the latter three linkages form a fatty modified organic polyisocyanate. The amount of fatty molecule added to the organic polyisocyanate depends upon the desired free NCO content. The fatty prepolymer may have a free NCO content of from 0 to 32 weight percent, thus including within the term "prepolymer" those compounds known as quasi-prepolymers. Should one desire to make a mold release additive, the free NCO content is kept low, for example, from 0 to about 17 weight percent, preferably from 0 to 8 weight percent, thereby concentrating the fatty content and reducing the amount of mold release agent that must be blended into the desired polyisocyanate. Alternatively, the free NCO content is maintained at from about 17 weight percent to 32 weight percent, preferably from about 19 weight percent to 26 weight percent, when reacting the fatty molecule in situ with the organic polyisocyanate batch used for molding a product. Although the fatty molecules may be reacted in situ with the organic polyisocyanate, the fatty prepolymer or fatty modified polyisocyanate produced by this process may, if desired, also be blended with other organic polyisocyanates to adjust the free NCO content, viscosity, or other properties.

The organic polyisocyanate used to produce the mold release composition may be selected from any one of the commercially available polyisocyanates and includes aliphatic, cycloaliphatic and preferably aromatic multifunctional isocyanates. Examples include in detail: alkylene diisocyanate having 2 to 14 carbon atoms in the alkylene radical such as ethylene diisocyanate, 1,4-tetramethylene diisocyanate, 1,12-dodecane diisocyanate, and preferably 1,6-hexamethylene diisocyanate; cycloaliphatic di- and polyisocyanates such as cyclobutane-1,3-diisocyanate, cyclohexane-1,3-and -1,4-diisocyanate, as well as any desired mixture of these isomers, hexahydrotoluene-2,4-and -2,6-diisocyanate as well as the corresponding isomer mixtures, 2,2'-, 2,4'-and 4,4'-dicyclohexylmethane diisocyanate and the corresponding isomer mixtures, polycyclohexyl-polymethylene polyisocyanates, mixtures of dicyclohexylmethane diisocyanates, and polycyclohexyl-polymethylene polyisocyanates and preferably 1-isocyanato-3,3,5-trimethyl-5-isocyanatomethyl-cyclohexane and preferably aromatic di- and polyisocyanates such as 1,3- and 1,4-phenylene diisocyanate, 2,2'-, 2,4'- and 4,4'-diphenylmethane diisocyanate and the corresponding isomer mixtures, 2,4'- and 2,6-toluene diisocyanate as well as the corresponding isomer mixtures, 2,4,6-trisocyanatotoluene, triphenylmethane-4,4',4"-triisocyanate and polyphenyl-polymethylene polyisocyanates and preferably mixtures of di- and higher functional polyisocyanates (polymeric MDI). The di- and higher functional polyisocyanates may be used individually or in the form of mixtures.

Other suitable organic polyisocyanates are the modified polyisocyanates obtained by the reacting of the above-mentioned organic polyisocyanates. Examples of modified polyisocyanates include the uretonimine-carbodiimide group containing polyisocyanates illustrated in German Patent No. 1,092,009 and U.S. Pat. Nos. 4,743,626; 4,284,730; 3,998,766; and 3,152,162. The urethane group containing polyisocyanates as described in U.S. Pat. No. 3,394,164; the allophanate group containing modified polyisocyanates as described in U.S. Pat. No. 4,738,991 and British Patent No. 994,890; urea group containing polyisocyanates as described in German Patent No. 1,230,778; and biuret group containing polyisocyanates as described in U.S. Pat. Nos. 3,124,605 and 3,526,652 and German Patent No. 1,101,394. For RIM applications, it is preferred to use as the organic polyisocyanate uretonimine-carbodiimide group or urethane group containing polyisocyanates. All the organic polyisocyanates mentioned above may be used as the master batch to which the mold release agent may be blended or as the organic polyisocyanate with which is reacted the fatty molecule to produce a mold release agent or a final batch having mold release properties.

The fatty prepolymer having a urethane linkage is prepared by reacting any of the above organic polyisocyanates with any of the described terminal fatty chain-containing molecule having primary or secondary hydroxyl groups (fatty alcohol). Preferred organic polyisocyanates are diphenylmethane diisocyanate (MDI) containing a predominant amount of 4,4'-MDI, a urethane modified 4,4'-MDI having been modified by reacting a polyol of less than 500 molecular weight with 4,4'-MDI, or an allophanate modified MDI obtained by reacting the same low molecular weight polyol in the presence of an allophanate promoting catalyst. The fatty alcohol is preferably a primary alcohol, having preferably only one hydroxyl functionality in the molecule. The terminal fatty chain preferably contains 8 to 18 hydrogen substituted aliphatic carbon atoms in succession or 6 to 8 perfluorinated carbon atoms in succession.

The fatty alcohol is generally reacted with the organic polyisocyanate by adding the fatty alcohol to the organic polyisocyanate under an inert nitrogen atmosphere at temperatures from about 45° C. to 70° C.; and after addition is complete, the temperature is raised to about 75° C. to 90° C. for a period of one to three hours or until all of the hydroxyl groups have been reacted with the isocyanate groups. The amount of fatty alcohol added is preferably from 0.5 weight percent to 5 weight percent, more preferably 1 weight percent to 3 weight percent and reacted with 95 weight percent to 99.5 weight percent, preferably 97 weight percent to 99 weight percent of the organic polyisocyanate. The mold release composition is preferably made in situ as a fatty prepolymer whose free NCO content is adjusted to the range of 17 weight percent to 32 weight percent, preferably 20 weight percent to 25 weight percent, the latter range being obtained by starting the reaction with a modified-MDI rather than pure-MDI.

The fatty prepolymer having a urethane linkage may be represented by formula (a) when the organic polyisocyanate is reacted with a primary fatty alcohol or formula (b) when reacted with a secondary fatty alcohol, the organic polyisocyanate being MDI or modifications thereof:

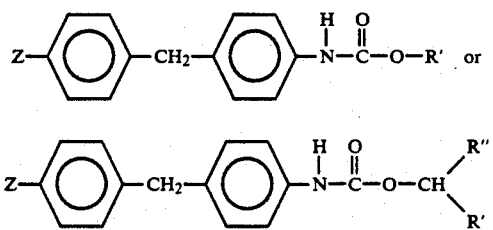

wherein Z is an isocyanate group or a modified polyisocyanate residue, and R' and R" are the residue from the fatty alcohol.

The fatty prepolymer having a urea linkage is prepared by reacting an organic polyisocyanate with a terminal fatty chain-containing molecule having a primary amine functionality (fatty amine). The preferred organic polyisocyanate is a uretonimine-carbodiimode modified 4,4'-MDI containing from 65 weight percent to 90 weight percent 4,4'-MDI and 10 weight percent to 35 weight percent of uretonimine-carbodiimide modified 4,4'-MDI; and also the aforementioned urethane modified 4,4'-MDI. The fatty amine advantageously has from 8 to 22 aliphatic carbon atoms in succession or 6 to 8 perfluorinated carbon atoms. The fatty amine also preferably contains one or more ether groups beyond the terminal chain.

It is preferred to add from 0.5 weight percent to 5 weight percent of the fatty amine to the organic polyisocyanate under an inert nitrogen atmosphere at 45° C. to 75° C., and thereafter heat the mixture at temperatures from 85° C. to 150° C., preferably from 95° C. to 135° C., for about one to three hours or until the solution is clear. The free NCO content is adjusted by the amount of fatty amine added and by adjusting the initial free NCO content of the organic polyisocyanate to achieve a final free NCO content preferably at 17 weight percent to 32 weight percent, more preferably at 17 weight percent to 23 weight percent for in situ reactions. If a fatty prepolymer additive is prepared having less than 17 weight percent free NCO content, the final prepolymer batch to which the additive is blended should have a final free NCO content within this range.

Fatty prepolymers having urea linkages may be represented by the following formula in the case where MDI or modifications thereof are employed as the organic polyisocyanate and the fatty amine contains only one primary amine group:

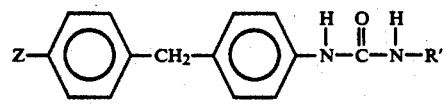

where Z is an isocyanate or a modified segment of MDI, and R' is the residue of the fatty amine.

The fatty prepolymer having oxazolidinone linkages are prepared by reacting an organic polyisocyanate with a terminal fatty chain-containing molecule having an epoxide functionality, preferably one epoxide functionality, referred to as fatty epoxides. Regardless of how many epoxide functionalities are found on the fatty epoxide molecule, it is required that the fatty chain be terminal and contain the required 8–24 aliphatic or cycloaliphatic, saturated or unsaturated hydrogen substituted carbon atoms. Suitable fatty epoxides include those alpha epoxides and two substituted oxiranes mentioned above.

The fatty epoxide is reacted with the polyisocyanate in the presence of an effective amount of oxazolidinone promoting catalyst. Suitable amounts of catalyst are from 0.01 to 4 weight percent of catalyst based on the weight of all ingredients used to prepare the fatty prepolymer. Examples of catalysts that may be employed include quaternary ammonium slats, metal alkoxides, metal halides, and organometallic compounds such as trialkyl aluminum.

The oxazolidinone linkages formed by the reaction between the fatty epoxide and the organic polyisocyanate may be represented by the following general formula:

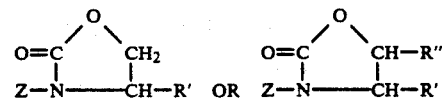

where Z is the isocyanate residue, R' is the residue from the fatty epoxide, and R" the residue from a two substituted oxirane ring containing fatty molecule.

The fatty modified polyisocyanates of the invention include those having an allophanate linkage obtained by reacting a terminal fatty chain-containing molecule having hydroxyl groups (fatty alcohol) with an organic polyisocyanate under certain reaction conditions well known in the art and preferably in the presence of allophanate promoting catalyst. Methods of preparing allophanate linked polyisocyanates are described in U.S. Pat. No. 4,738,991, incorporated herein by reference. A suitable method includes the fatty allophanate modified polyisocyanates are prepared by reacting an organic polyisocyanate, preferably MDI, more preferably greater than 90 weight percent 4,4'-MDI, based on all forms of isocyanate present, with a fatty alcohol at temperatures ranging from 45° C. to 130° C. for one to ten hours under an inert gas atmosphere, optionally but preferably in the presence of an allophanate promoting catalyst. In one procedure, an allophanate promoting catalyst is mixed in with the MDI after which the fatty alcohol is added; and in an alternative second procedure, the allophanate promoting catalyst is mixed in after the fatty alcohol has been added to the MDI. During addition of the fatty alcohol under either procedure, the temperature is held to about 45° C. to 80° C., preferably 55° C. to 65° C., any point in time after which the temperature is raised to about 95° C. to 130° C., preferably 100° C. to 115° C., and held at that temperature until the free NCO content drops to the desired level. Although a catalyst is not necessary, in which case the upper limits of the time or temperature ranges are pushed to attain allophanate linkage formation, a catalyst may be used in the interests of efficiency, especially if one desires to react a secondary hydroxyl group with the isocyanate.

The catalysts which may be employed are any which are suitable for the promotion of allophanate linkages. These include metal carboxylates, alcoholates, oxides, phenolates and metal chelates. The preferred catalysts are zinc-, cobalt-, nickel-, ferric-, and aluminumacetylacetonates, dibutyltin dilaurate, dibutyltin oxide, stannous octoate, and dibutyltin diacetate. The amount of catalyst is an amount effective to promote allophanate linkage formation, preferably 0.008 weight percent to 1.0 weight percent based on the weight of the polyisocyanate and alcohol.

The catalyst deactivators which may be employed are aliphatic and aromatic acid chlorides such as acetyl chloride, benzoyl chloride, and benzenesulfonyl chloride, oxalyl chloride, adipyl chloride, sebacyl chloride, and carbonyl chloride. Also inorganic acids such as perchloric acid and strong organic acids such as trifluoromethanesulfonic acid and trifluoroacetic acid may be employed. Chloroformates may also be employed such as methyl chloroformate, ethyl chloroformate, isopropyl chloroformate, n-butyl chloroformate, sec-butyl chloroformate, and diethylene glycol bis-chloroformate.

The fatty alcohol employed in the allophanate forming reaction is any one of the aforementioned fatty primary or secondary alcohols. Preferred are primary hydroxyl functional molecules having 8 to 18 hydrogen substituted carbon atoms.

The final NCO content is advantageously from 25 weight percent to 30 weight percent, with 26 weight percent to 28 weight percent most preferred. During formation of the fatty allophanate polyisocyanate, the free NCO content can be reduced as much as desired to form a precursor which is then blended with further organic polyisocyanate to raise the free NCO content to the desired final level. The fatty allophanate precursor can be blended with urethane modified or uretonimine-carbodiimide modified polyisocyanate, preferably the latter.

The fatty allophanate modified polyisocyanate of the present invention may be represented by the following general formula where an MDI based polyisocyanate is reacted with a fatty alcohol:

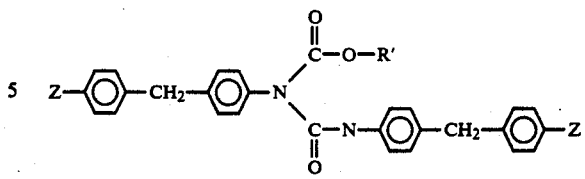

where Z is an isocyanate group or the residue of the polyisocyanate such as the urethane or carbodiimide-uretonimine residue, and R' is the residue of the fatty alcohol.

In the formulation of fatty biuret modified polyisocyanates, an organic polyisocyanate, preferably a urethane modified polyisocyanate or MDI, is reacted with a fatty amine under reaction conditions similar to those used in the formation of allophanate linkages. Such reaction conditions are described in U.S. Pat. No. 4,803,229, incorporated herein by reference. The fatty amine is added to the organic polyisocyanate at 45° C. to 80° C. which begins the formation of urea linkages. The reaction temperature is raised at any point in time after addition of the fatty amine is complete to within a range of about 80° C. to about 150° C., preferably 90° C. to 135° C., to bring about the formation of biuret linkages. This temperature is continued until the solution is clear or further continued until the desired free NCO content is attained. Although the same catalysts as mentioned in connection with promotion of allophanate linkages can also be used to catalyze the reaction of the urea and isocyanate to form biuret linkages, the amine functionalities are sufficiently autocatalytic that a catalyst additive is not necessary.

The most preferred organic polyisocyanate which is modified into a biuret is itself a urethane modified polyisocyanate which has been modified by reacting 4,4'-MDI with a low molecular weight (<500 MW) polyol heretofore described. The fatty amine is any fatty amine described above, preferably a hydrogen substituted 8 to 24 aliphatic carbon atom alkyl. Also found advantageous were those fatty amines having an ether linkage beyond the terminal fatty chain with 8 to 15 hydrogen substituted aliphatic carbon atoms in succession as the terminal fatty chain, more preferably a mixture of species having 12 to 15 carbon atoms as the terminal fatty chain.

A suitable amount of fatty amine added is 1 weight percent to 6 weight percent, preferably 2 to 4 weight percent, to 95 weight percent to 99 weight percent, preferably 96 weight percent to 98 weight percent, of the organic polyisocyanate assuming that one desires to form the mold release composition in situ without the necessity for blending. The mold release, in any case, should have a final free NCO content of from 17 weight percent to 25 weight percent, preferably 18 weight percent to 22 weight percent.

The fatty biuret modified polyisocyanate of the present invention may be represented by the following general formula where an MDI based organic polyisocyanate is reacted with a fatty amine:

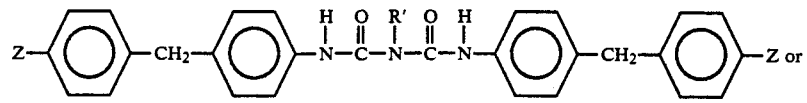

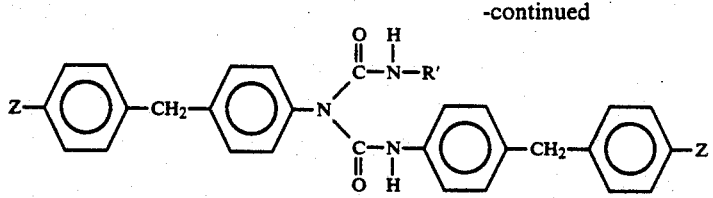

where Z is an isocyanate group or the residue of the polyisocyanate such as the urethane modified residue, and R' is the residue of the fatty amine.

The fatty modified polyisocyanates having a uretonimine-carbodiimide linkage are prepared by reacting an organic polyisocyanate with a terminal fatty chain-containing molecule having an isocyanate functionality in the presence of a carbodiimide promoting catalyst.

The organic polyisocyanate can be any one of those previously mentioned; but it is preferred to start with pure MDI, more preferably 50 weight percent or greater of the 4,4'-MDI isomer. To the organic polyisocyanate is added the fatty isocyanate and the carbodiimide promoting catalyst. The mixture is heated to temperatures ranging from 60° C. to 250° C., preferably from 90° C. to 150° C., to convert the isocyanate groups into carbodiimide groups. The reaction is allowed to proceed for a period of time and at a temperature sufficient for conversion of 1 weight percent to 35 weight percent of the isocyanate groups to carbodiimide groups, preferably 20 weight percent to 30 weight percent. The free NCO content of the reaction mixture is preferably 18 weight percent to 32 weight percent, more preferably 19 weight percent to 28 weight percent.

After the reaction proceeds to the desired point of conversion, the fatty carbodiimide modified polyisocyanate is allowed to cool to below 60° C. thereby promoting the formation of uretonimine linkages by reaction of the fatty carbodiimide polyisocyanate with further isocyanate. This reaction proceeds spontaneously as the contents are cooled without the need for a catalyst. Although the reaction proceeds spontaneously, usually not all of the carbodiimide linkages are converted to uretonimine linkages. Usually at room temperature, the molar ratio of uretonimine to carbodiimide modified polyisocyanates is around 9:1. Finally, a catalyst deactivator is added to the fatty carbodiimide modified polyisocyanate at its reaction temperature and/or lower, preferably added before cooling and at around 40° C. to 60° C.

Suitable carbodiimide promoting catalysts are the phospholine oxides, the diaza- and oxaza-phospholanes, triaryl arsines, arsine oxides, metallic derivatives of actyl acetone, phosphate esters, phosphine oxides, the organo-tin compounds, and those catalysts more specifically described in U.S. Pat. No. 4,743,626 incorporated herein by reference.

Suitable catalyst deactivators include salts such as magnesium chloride dihydrate, acid chlorides such as benzoyl chlorides and acetyl chlorides, acids such as hydrochloric acid, oxalic acid, phosphoric acid, benzenesulfonic acid, toluenesulfonic acid, methanesulfonic acid or trifluoromethane sulfonic acid, sulfonyl chlorides such as benzenesulfonyl chloride, toluenesulfonyl chloride and the like. Other deactivators which may be employed are such agents as dimethylsulfate, alkyl o,p-toluenesulfonates, methylchloride and similar compounds as disclosed in U.S. Pat. No. 3,769,318.

The fatty uretonimine-carbodiimide modified polyisocyanate may be used as is in the RIM process or may be blended with any of other organic polyisocyanates such as more 4,4'-MDI to raise the two-ring content, or blended with a standard uretonimine-carbodiimide modified polyisocyanate. After blending, it is preferred that the final free NCO content is from 24 weight percent to 29 weight percent.

Formation of the fatty uretonimine-carbodiimide modified polyisocyanate may be represented by the following general formulas, assuming one starts with 4,4'-MDI or modifications thereof:

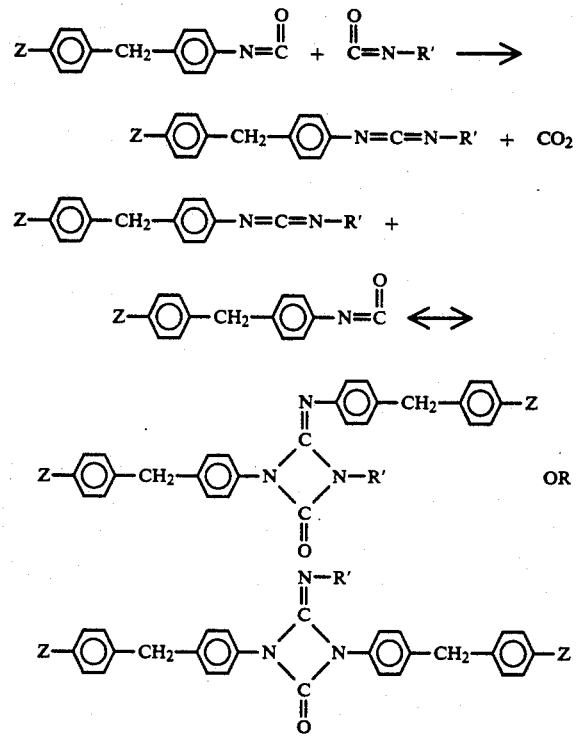

where Z is an isocyanate group or the modified residue of the MDI, and R' is the residue of the fatty molecule. It should be understood, however, that these general formulas and the foregoing description does not require all of the fatty isocyanate to form a carbodiimide linkage, since some or a substantial amount of the carbodiimide reaction may proceed between the organic polyisocyanates. Thus, the uretonimine-carbodiimide linked polyisocyanate may exist as a mixture of fatty uretonimine-carbodiimide modified polyisocyanates and standard uretonimine-carbodiimide modified polyisocyanates.

The fatty prepolymers and fatty modified polyisocyanates of the invention are preferably liquid and pourable at 25° C. after five days. Although the solutions may be somewhat hazy, it is more preferred that the solutions are clear and remain so at 25° C. for at least five days. The reaction between some fatty molecules and polyisocyanates described above may produce a combination that will crystallize or precipitate quickly out of solution at room temperature, and such solutions find little utility as mold release compositions unless one is willing to heat the compositions up and mix prior to injection in the RIM process. Thus, it is preferred that the solutions do not precipitate out of solution for at least five days at 25° C., and more preferably that they remain crystal free and clear for at least five days at 25° C.

The fatty prepolymers and fatty modified polyisocyanate are reacted with a polyol and a chain extender in the presence of other additives which may be deemed necessary such as a surfactants, mold release agents, dyes, fillers, blowing agent, and catalysts. Typical polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines, including aromatic, aliphatic and heterocyclic amines as well as mixtures thereof. Alkylene oxide adducts of compounds which contain two or more different groups within the above-identified classes may be used such as amino alcohols which contain an amino group and a hydroxyl group. Also, alkylene oxide adducts of compounds which contain one —SH group and one —OH group as well as those which contain an amino group may be used. Generally, the equivalent weight of the polyols will vary from 100 to 10,000, and preferably from 750 to 3,000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, palmelic acid, suberic acid, azelaic acid, subacic acid, brassylic acid, thapsic acid, maleic acid, fumaric acid, glutaconic acid, alpha-hydromuconic acid, betahydromuconic acid, alpha-butyl-alpha-ethyl-glutaric acid, alpha, beta-diethylsuccinic acid, isophthalic acid, terephthalic acid, hemimellitic acid, and 1,4-cyclohexane dicarboxylic acid and mixtures thereof. Any suitable polyhydric alcohol may be used as ethylene glycol, propylene glycol, trimethylglycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alpha-methyl glucoside, pentaerythritol and sorbitol and mixtures thereof. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as arylalkylene oxides such as styrene oxide. The polyalkylene polyether polyols may have either primary or secondary hydroxyl groups, preferably a predominant number of primary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as for example the process disclosed by Wurtz in 1859 and Encyclopedia of Chemical Technology, vol. 7, pages 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weight of from 100 to 5,000.

Suitable polyhydric polythio ethers which may be condensed with alkylene oxides include the condensation product of thiodiglycol of the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amine alcohol such as ethanol amine with the polycarboxylic acids set forth above or they may be made using the same components that make up the hydroxyl-containing polyesters with only a proportion of the components being a diamine such as ethylenediamine.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous compounds are prepared from the alkylene oxides and acids of phosphorous having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above. Suitable aliphatic thiols which may be condensed with alkylene oxides include alkane thiols containing at least 2-SH groups as 1,2-ethane dithiol, 1,2-propane dithiol, 1,3-propane dithiol, and 1,6-hexane dithiol; alkane thiols such as 2-butene-1,4-dithiol; and alkane thiol such as 3-hexane-1,6-dithiol.

Suitable amines which may be condensed with alkylene oxides include aromatic amines such as aniline, o-chloro aniline, p-amino aniline, 1,5-diamino naphthalene, methylene dianiline, the condensation products of aniline and formaldehyde, and diamino toluene; aliphatic amine such as methylamine, trisisopropanolamine, ethylenediamine, 1,3-diaminopropane, 1,3-diaminobutane, 1,4-diaminobutane, and hydroxyalkyl-amine initiators such as 2-hydroxyethylenediamine, 2- and 3-hydroxypropylamine, bis[2-hydroxyethyl]ethylamine, and bis[2-hydroxyethyl]-2-hydroxypropylamine.

Preferred amines are the aliphatic diamines and the hydroxylamines. The amine initiators may be fully oxyalkylated to produce a tertiary amine free of amino hydrogens as taught in U.S. Pat. No. 3,073,576. Alternatively, one may produce amine-initiated polyether polyols which have free amino hydrogens and hydroxyl-functional polyoxyalkylene moieties. Such polyols are prepared as taught by U.S. Pat. No. 4,517,383, by oxyalkylating an aliphatic or aromatic amine with a stoichiometric excess of alkylene oxide, but utilizing an extraordinarily high amount of basic oxyalkylation catalyst which must be present at the onset of oxyalkylation. Such dual-functionality asymmetric polyols create both urethane and urea linkages in the finished product and further have the advantage of lower viscosities that their fully oxyalkylated analogues.

Also useful in minor amounts are conventional polyether polyols and acrylonitrile/styrene graft polymer polyol dispersions. Both these types of polyols are well-known items of commerce and generally have functionalities from 2 to about 8, preferably from 2 to about 3, and hydroxyl numbers from 20 to about 600, preferably from 20 to about 500. The use of such polyols increases the urethan linkages in the finished product.

Hydroxyl-functional and amine-functional aliphatic or aromatic chain extenders may be used in RIM or microcellular systems. Preferred hydroxyl-functional chain extenders are ethylene glycol, glycerine, trimethylolpropane, 1,4-butanediol, propylene glycol, dipropylene glycol, 1,6-hexanediol, and the like. Suitable aromatic amine-functional chain extenders include 2,4-diaminotoluene, 2,4-diaminophenylmethane, 1,3-phenylenediamine, 1,4-phenylenediamine, and 4,4-diaminodiphenylmethane, diethyltoluene diamine (DETDA) and the other hindered amines disclosed in Weber U.S. Pat. No. 4,218,543. Aliphatic amine chain extenders include those mentioned above useful as initiators for the polyol. The amount of chain extender is generally less than 15 weight percent based on the weight of the polyol, preferably less than 10 weight percent, more preferably less than 4 weight percent for high density systems.

The blowing agents employed in this invention include any compound capable of generating an inert gas under the conditions used to cure the elastomer (e.g., by reaction to produce a gas or by volatilization). Suitable blowing agents include water, in which case a corresponding amount of excess isocyanate is used, volatile halocarbons, such as methylene chloride,trichloromonofluoromethane,dichlorofluoromethane,dichloromonofluoromethane, dichloromethane, trichloromethane, bromotrifluoromethane, chlorodifluoromethane, chloromethane, 1,1-dichloro-1,1-fluoromethane, 1,1-difluoro-1,2,2-trichloroethane, chloropentafluoroethane, 1-chloro-1-fluoroethane, 1-choro-2-fluoroethane, 1,1,2-trifluoroethane, 2-chloro-1,1,2,3,4,4-nonofluorobutane, hexafluorocyclobutae, and octafluorobutane. Other useful blowing agents include low-boiling hydrocarbons such as butane, pentane, hexane, cyclohexane, and the like. The amount of blowing agent used is determined by the desired density of the molded product which ranges from 5 pcf to 70 pcf depending upon the desired application.

Any suitable catalyst may be used if desired, for example, where the polyol contains no free amino hydrogens. Suitable catalysts include tertiary amines such as, for example, triethylenediamine, N-methylmorpoline, N-ethylmorpholine, diethyl amino ethanol, N-lauryl morpholine, 1-methyl-4(dimethylaminoethyl)piperazine, 3-methoxy-N,N'-dimethylpropylamine, N,N,N'-trimethylisopropyl propylenediamine, N,N,N',N''-tetraethylpropylenediamine, dimethylbenzylamine, mixtures thereof, and the like. Other suitable catalyst are, for example, tin compounds such as stannous chloride, tin salts of carboxylic acids, such as dibutyltin di-2-ethylhexanoate and stannous octoate, as other organic metallic compounds such as are disclosed in U.S. Pat. No. 2,846,408.

If desired, a surface active agent may be employed. Numerous surface active agents have been found satisfactory. Nonionic surfactants are preferred. Of these, the nonionic surface active agents prepared by the sequential addition of propylene oxide and then ethylene oxide to the propylene glycol and the solid or liquid organo silicones have been found particularly desirable. Other surface active agents which are operative include polyethylene glycol ethers of long chain alcohols, tetraamine or alkanolamine salts of long chain alkyl acid sulfate esters, alkyl sulfonic esters, and alkyl arylsulfonic acids.

Additional internal mold release agents may be added to the polyol to further assist in mold release. These generally include silicones and long chain carboxylate salts such as the ammonium, calcium, or zinc salts of 7 to 24 carbon carboxylic acids. External mold release agents are well known and may be sprayed at various intervals onto the mold surfaces prior to molding, if desired.

This invention is particularly well suited for use in Reaction Injection Molding (RIM) systems utilizing a liquid polyether polyol and liquid polyisocyanates. Suitable RIM systems are described in two Kunstoffe articles appearing in Volume 61, August 1971, pages 540-544 and September 1971, pages 639-645. The disclosures of both of these are incorporated herein by reference.

In the mixing head, metered amounts of polyisocyanate and polyether polyol (in appropriate relative amounts of producing the desired polyurethane) are instantly intimately mixed by impingement of one against the other in a mixing chamber in the mixing head. Other additives such as catalyst, blowing agent, and internal mold release agent, as well as additional active hydrogen component, are pre-mixed with the polyether polyol (or the polyisocyanate, if desired) before it is metered and pumped to the mixing head. The two liquid reactant streams are pressurized and forced against each other upon entering the mixing chamber so that an intimate mixture immediately results. Impingement mixing of the type described above requires only a few seconds of time, for example, of the order of four to ten seconds. The resulting mixture is then introduced into the mold while recirculating the two reactant streams back to their respective pumps. The entire cycle through the molding stage and ejection from the mold can consume only a few minutes, for example, from one to four minutes. If full utilization of the molds is desired, there is substantially no time available for cleaning the mold surfaces and treating same with an external mold release. The self-release compositions of this invention are fully suitable for use in impingement mixing RIM systems and are compatible with the requirements of such systems. Furthermore, the molded products resulting from the use of the compositions of this invention require no subsequent treatments to render them suitable for painting or other finishing operations and can be painted or otherwise finished directly upon removal from the mold. Since the polyurethane-forming and polyurea-forming reactions involved in the cure of the reaction mixtures are exothermic, curing can usually be accomplished without the application of heat from an external source in those cases where polyurea-forming components are used.

The invention is described by way of examples below which illustrate various types of fatty prepolymers and fatty modified polyisocyanates and are not to be taken as limiting the full scope of the invention described and claimed herein.

Iso A is a urethane-modified diphenylmethane diisocyanate having about 50 weight percent prepolymer modified with a 400 molecular weight glycol and about 50 weight percent diphenylmethane diisocyanate of which 48 weight percent is 4,4'-MDI, having a free NCO content of about 23 weight percent.

Iso B is a uretonimine-carbodiimide-modified 4,4'-MDI having 25 weight percent modified prepolymer of which 90 weight percent is uretonimine-modified prepolymer, having a free NCO content of about 29.5 weight percent.

Iso C is pure MDI having about 98 weight percent 4,4'-MDI, the remainder being 2,4'-MDI, having a free NCO content of 33.5 weight percent.

Kemamine ® 974 is a mixture of saturated and unsaturated long chain primary amines derived from tallow fatty acids, the fatty chain composition being approximately 4 weight percent Myristic ($C_{14}$), 29 weight percent Palmitic ($C_{16}$), 25 weight percent Stearic ($C_{18}$), 38 weight percent Oleic ($C_{18}$), and 4 weight percent Linoleic ($C_{18}$). The product is commercially available from Witco Chemical Corp.

Adogen ® 183 is a primary alkyl ether amine having the following general structure: R—O—$CH_2$—$CH_2$—$CH_2$—$NH_2$, where R is a $C_{13}$ alkyl carbon chain, commercially available from Sherex Chemical Company, Inc.

Adogen ® 185 is the same as Adrogen ® 183, except R is a $C_{12}$-$C_{15}$ mixture with a total amine value of 194.

Adogen ® 188 is the same as Adrogen ® 183, except R is a $C_8$-$C_{10}$ mixture with a total amine value of 253.

FC-10 is a fluorocarbon having the formula $C_8F_{17}SO_2N(C_2H_5)CH_2CH_2OH$, commercially available from 3M Industrial Chemical Products Division.

L-10037 is a fluorocarbon having the formula cyclic-$C_6F_{11}CH_2OH$ (cycloaliphatic isomer mixture) commercially available from 3M Industrial Chemical Products Division.

L-9185 is a fluorocarbon having the formula $C_7F_{15}CH_2OH$ also available from 3M.

Polyol A is an ethylene oxide-propylene oxide adduct of trimethylolpropane terminated with 15 weight percent ethylene oxide, having a molecular weight of about 5100 and a nominal OH number of 25.

Polyol B is an ethylene oxide-propylene oxide adduct of propylene glycol terminated with 20 weight percent ethylene oxide and having a molecular weight of about 3,800 and a nominal hydroxyl number of about 26.

Polyol C is an ethylene oxide-propylene oxide adduct of glycerine terminated with 21 weight percent ethylene oxide with a molecular weight of 5,049 and a hydroxyl number of about 28.

BDO is 1,4-butanediol acting as a chain extender.

T-12 is dibutyltin dilaurate, a catalyst commercially available from Air Products Corp.

R-8020 is an amine catalyst sold by Air Products under the DABCO series.

Iconol DA-4 is an ethoxylate decyl alcohol commercially available from BASF Corporation.

DC-1248 is a silicone compound acting commercially available from Dow Corning.

DC-2648 is a silicone compound commercially available from Dow Corning.

EX-678B is carbon black in polyol.

DABCO 33-LV is an amine-based catalyst commercially available from Air Products Corp.

PPK is also carbon black in polyol.

EXAMPLE 1

Preparation of the Fatty Prepolymers and the Fatty Modified Polyisocyanates

A four-neck flask equipped with an overhead stirrer, thermocouple well, addition funnel, and nitrogen inlet was charged with the type and amount of isocyanate indicated in Table 1, Samples 1–24 below; and the temperature was held at 60° C. while the indicated fatty molecule was added dropwise. After addition was completed, the temperature was raised to the high temperature value reported in Table 1. The amount of time that the reaction was heated after the completion of addition is also stated in Table 1. After allowing the fatty prepolymer to cool, the viscosity and percent FNCO determinations were made. Comments indicating the appearance of the derivative are also stated.

EXAMPLE 3

Uretonimine-Carbodiimide Modified Polyisocyanate

A four-necked flask equipped as above was charged with Iso C, a fatty isocyanate, and 5–10 ppm based on the Iso C charge, of 3-methyl-1-phenyl-2-phospholene-1 oxide catalyst as a 1 percent solution in methyl ethyl ketone. The reaction was allowed to proceed at 116° C. until the isocyanate content as indicated in Table 1 was reached. Then, 100 ppm of trifluoromethane sulfonic acid catalyst deactivator as a 10 percent solution in diisodecyladipate was added. The temperature was allowed to drop to 50° C. where a second dose of 60 ppm of the deactivator was added. The mixture was then blended with Iso B as indicated in Table 1, Samples 30–31.

EXAMPLE 4

Fatty Allophanate Modified Polyisocyanate

A four-necked flask equipped as above was charged with Iso C and 0.025 percent of zinc acetoacetonate (based on isocyanate and alcohol charge). At 60° C., the fatty alcohol was added dropwise. The temperature was raised to 105° C. and held there until the NCO dropped to the value that is indicated in Table 1. At this time, 0.03 percent of the benzoyl chloride deactivator was added, dropped, and the allophanate was then allowed to cool. The allophanate was diluted with Iso B as indicated in Table 1, Samples 25–29.

TABLE 1

| SAMPLE | ISO | ISO ANT (pbw) | FATTY COMPOUND | FATTY ANT (pbw) | HIGH TEMP | HEATING TIME AFTER ADDITION (MIN) | % NCO | VISC. (cp) | COMMENTS |
|---|---|---|---|---|---|---|---|---|---|
| 1 | A | 980 | 1-DODECANOL | 20 | 80 | 75 | 23.6 | — | CLEAR |
| 2 | A | 970 | 1-DODECANOL | 30 | 80 | 75 | 21.7 | 1030 | CLEAR |
| 3 | A | 3920 | 1-DODECANOL | 20 | 80 | 90 | 23.6 | 888 | CLEAR |
| 4 | A | 980 | 1-OCTANOL | 20 | 80 | 75 | 22.5 | 920 | CLEAR |
| 5 | A | 3920 | 1-OCTANOL | 80 | 80 | 80 | 21.4 | 1060 | CLEAR |
| 6 | A | 960 | 1-DODECANOL | 40 | 80 | 70 | 21.65 | 2270 | CLOUDY AFTER 5 DAYS, SEPARATED |
| 7 | A | 990 | KEMAMINE ® P-974 | 10 | 127 | 195 | 21.65 | 2270 | CLEAR |
| 8 | A | 980 | KEMAMINE ® P-974 | 20 | 120 | 60 | 22.1 | 1410 | CLEAR |
| 9 | A | 3920 | KEMAMINE ® P-974 | 80 | 118 | 392 | 21.2 | 2790 | CLEAR |
| 10 | A | 960 | KEMAMINE ® P-974 | 40 | 123 | 330 | 19.66 | 6280 | CLOUDY AFTER 4 DAYS |
| 11 | A | 960 | KEMAMINE ® P-989 | 40 | 135 | 75 | 18.62 | 5440 | CLEAR WITH SOME CRYSTALS GROWING |
| 12 | A | 980 | ADOGEN ® 183 | 20 | 100 | 40 | 21.7 | 1470 | CLEAR |
| 13 | A | 980 | ADOGEN ® 185 | 20 | 120 | 57 | 21.65 | 1410 | CLEAR |
| 14 | A | 980 | ADOGEN ® 188 | 20 | 120 | 60 | 22.44 | 2220 | CLEAR |
| 15 | A | 960 | ADOGEN ® 183 | 40 | 90 | 200 | 20.75 | 2490 | CLOUDY BUT PRECIPITATED AFTER 5 DAYS |
| 16 | A | 960 | ADOGEN ® 185 | 40 | 108 | 115 | 20.4 | 3415 | CLEAR |
| 17 | B | 980 | FC-10 | 20 | 80 | 75 | 28.9 | 51 | HAZY |
| 18 | A | 960 | ADOGEN ® 183/185 | 40 | 102 | 170 | 20.78 | 2660 | SLIGHT HAZE |
| 19 | A | 960 | ADOGEN ® A83/1-DODECANOL 1:1 | 40 | 90 | 130 | 21 | 1370 | SLIGHT HAZE |
| 20 | A | 980 | L-10037 | 20 | 80 | 70 | 22.7 | 882 | HAZY |
| 21 | A | 980 | L-9185 | 20 | 80 | 70 | 22.6 | 804 | HAZY |
| 22 | B | 980 | L-10037 | 40 | 80 | 75 | 38.8 | 32 | HAZY |
| 23 | A | 960 | L-10037 | 40 | 80 | 75 | 21 | 1040 | HAZY |
| 24 | B | 960 | L-10037 | 40 | 80 | 70 | 27.8 | 48 | HAZY |
| 25 | C | 900 | 1-DODECANOL | 100 | 105 | 120 | 25.4 | — | ALLOPHANATE, BLENDED W/ISO B 91:1. FINAL NCO 27.8% |
| 26 | C | 900 | 1-OCTADECANOL | 100 | 105 | — | 27.2 | — | ALLOPHANATE, BLENDED 1:1 W/ISO B FOR FINAL NCO OF 28.0% CLEAR. 42cP. |
| 27 | C | 920 | 1-OCTADECANOL | 80 | 105 | — | 28.2 | — | ALLOPHANATE, BLENDED 1:1 W/ISO B FOR FINAL NCO OF 28.0%, 42.0 cP. CLEAR |
| 28 | C | 800 | 1-DODECANOL | 200 | 105 | 135 | 17.9 | — | ALLOPHANATE BLENDED 1:3 W/ISO B, FNCO 27.7%, 100 cP, SLIGHTLY CLOUDY |
| 29 | C | 800 | 1-DODECANOL | 200 | 105 | 135 | 17.9 | — | ALLOPHANATE BLENDED 1:2 W/ISO B, FNCO 25.6%, 100 cP, SLIGHTLY CLOUDY |

TABLE 1-continued

| SAMPLE | ISO | ISO ANT (pbw) | FATTY COMPOUND | FATTY ANT (pbw) | HIGH TEMP | HEATING TIME AFTER ADDITION (MIN) | % NCO | VISC. (cp) | COMMENTS |
|---|---|---|---|---|---|---|---|---|---|
| 30 | C | 900 | OCTADECYL-ISO-CYANATE | 100 | 116 | — | 26.5 | — | CARBODIIMIDE-BLENDED 1:1 W/ISO B, FNCO 26.7%, 77 cP, CLEAR |
| 31 | C | 400 | OCTADECYL-ISO-CYANATE | 100 | 116 | — | 20.3 | — | CARBODIIMIDE-BLENDED W/500 g ISO C, THEN A 1:1 BLEND W/ISO B, FNCO 27.8% 58.1 cP, SLIGHTLY CLOUDY |

All of the above formulations, except Sample 15, were suitable for further testing of mold releasing properties. Sample 15 precipitated out the urea when too much Adogen ® amine was added to the isocyanate. In general, the reaction product appeared the clearest when less than 40 pbw of the fatty molecule was added to the isocyanate based on 1,000 pbw of the total weight (less than 4 weight percent), although reaction products with 4 weight percent or more are still operative as mold release agents.

EXAMPLE 4

Each of the fatty isocyanates of Samples 1, 8, and 12-14 were reacted with a polyol component using a hand mix procedure and poured over vinyl sheets laid up in 6"×12"×⅛" aluminum plaque molds. The molds were clamped shut, allowing the ingredients to react. The polyol component comprised 72.84 pbw of Polyol A, 8.51 pbw of Polyol B, 13.25 pbw of BDO, 0.033 pbw of T-12, and 0.42 pbw of R-8020. The plaques were molded at an index of 100. The hand mix procedure involved mixing each of the polyol ingredients for ten seconds at about 2200 rpm using a 3" German mix blade. The fatty isocyanate and the polyol were then mixed at 2200 rpn for 5-10 seconds and poured into the mold. The same polyol batch was used for each sample. The plaque sample numbers correspond to the isocyanate sample numbers employed in the preparation of the plaque.

The peel strength, flex modulus, and tensile strengths of each molded plaque were measured and reported below in Table 2. The peel strength was tested by measuring the force in pounds/inch necessary to peel the vinyl skin from the molded polyurethane plaque.

TABLE 2

| PLAQUE SAMPLES | PEEL STRENGTH (LBS/IN. WIDTH) | FLEX MODULUS (PSI) | TENSILE STRENGTH (PSI) |
|---|---|---|---|
| 1 | 2.96 | 4522 | 582 |
| 8 | 3.11 | 4819 | 1341 |
| 12 | 1.5 | 4225 | 1539 |
| 13 | 4.24 | 4873 | 1396 |
| 14 | 1.91 | 4120 | 1399 |

EXAMPLE 5

Isocyanate Samples 2, 10, 15, and 16 were also tested for releasability by reacting with a polyol component at a 100 index in a 6"×12"×⅛" aluminum plaque mold laid up with a vinyl skin. The polyol component in this instance comprised 72.84 pbw Polyol A, 8.5 pbw Polyol B, 13.25 pbw BDO, 0.033 pbw of T-12, 0.42 pbw of R-8020, 3 pbw DA-4, and 1 pbw of DC-1248, except that 1 pbw of DC-2648 was used in Plaque Sample 16. The polyol was hand mixed as above, subsequently mixed with the respective fatty isocyanate, poured into the open mold containing the vinyl skin which was then clamped shut, allowing the ingredients to react.

The plaques were tested for releasability according to ASTM D903, the results of which are reported below in Table 3. A control sample was also prepared by reacting a standard Iso A with the polyol component at a 100 index and tested for releasability.

TABLE 3

| PLAQUE SAMPLE | PEEL STRENGTH (POUNDS PER INCH) | FLEX MODULUS (PSI) | TENSILE STRENGTH (PSI) |
|---|---|---|---|
| CONTROL | 6.27 | 5245 | — |
| 2 | 2.32 | 4732 | — |
| 10 | 3.39 | 4062 | — |
| 15 | 0.134 | 1666 | — |
| 16 | 2.37 | 3155 | — |
| 17 | 2.98 | — | 901 |
| 18 | 2.00 | — | 1423 |
| 19 | 3.93 | — | 869 |
| 20 | 2.46 | — | 869 |
| 21 | 2.16 | — | 933 |

The results above in Table 3, when compared to the control, indicate that an improvement in release was obtained by modifying the polyisocyanate to form a fatty isocyanate, as shown by the lower peel strengths necessary to remove the vinyl skin from the molded plaque. The results in Table 2 for plaques formed by reacting a fatty isocyanate with a polyol component that did not contain other internal mold releases displayed comparable release values to the plaque samples in Table 3 which were formed with a polyol containing other internal mold release additives. Thus, the fatty isocyanates are sufficient to obtain good releasability without adding other internal mold release agents.

EXAMPLE 6

A resin blend was made comprising 75.87 pbw Polyol A, 8.87 pbw Polyol B, 13.8 pbw BDO, 0.44 pbw R-8020, 0.035 pbw T-12, and 0.98 pbw of EX-678B. To this resin blend was added Iso Sample 25 at an Index of 105 and stirred until homogeneous. About 200 grams of the mixtures was poured onto a piece of aluminum foil in a 10"×10"×⅛" plaque mold preheated to 150° F. to 155° F. The mold was closed, and the plaque was demolded after two minutes. The part was cut into one-inch strips after ten minutes, and 15 minutes thereafter, the releasability of the foil from each one-inch strip was measured. The procedure was repeated for the remaining Isocyanate Samples, which numbers correspond to the Plaque Samples reported below in Table 4. The releasability of the foil was measured by the force in pounds per linear inch necessary to delaminate the foil from the plaque.

TABLE 6

| PLAQUE SAMPLE | RELEASABILITY (ppi) FOR EACH 1" STRIP 1-6 | | | | | |
|---|---|---|---|---|---|---|
| | 1 | 2 | 3 | 4 | 5 | 6 |
| 25 | 2.7 | 2.8 | 2.5 | 1.9 | 2.8 | 2.3 |
| 26 | 3.7 | 5.0 | 4.0 | 3.9 | 4.5 | 3.7 |
| 27 | 1.1 | 1.0 | 1.4 | 0.9 | 1.2 | 1.1 |
| 28 | 2.6 | 2.7 | 2.0 | 2.5 | 4.2 | 2.3 |
| 29 | 3.4 | 3.6 | 3.8 | 3.5 | 3.9 | 4.6 |
| 31 | 1.1 | 1.0 | 1.1 | 1.2 | 1.4 | 0.8 |

The best releases according to the results above were Samples 27 and 31 using a fatty allophanate prepared with 8 weight percent of a fatty alcohol and a fatty carbodiimide-uretonimine, respectively. Thus, these two formulations form a more preferable part of the invention.

EXAMPLE 7

In this experiment, the fatty isocyanate was machine run with a polyol in a DETDA chain extended system.

The polyol composition was a blend of 78.25 weight percent Polyol C, 20.5 weight percent diethylenetoluenediamine (DETDA) chain extender, 1 weight percent DABCO 33-LV, and 0.25 weight percent T-12. the Iso was Isocyanate Sample 2 made with dodecanol.

Each component was loaded into tanks connected to a high pressure impingement mixing machine. The polyol composition was kept at 90° F. in the tank, the fatty Iso at 90° F. in the tank, and each were shot into an aluminum mold preheated at 175° F. at 2.54 lbs/second. The Iso pressure was 2,250 psi, the Polyol pressure was 1,850 psi, and the two were shot at a ratio of 57.95 pbw Iso to 100 pbw Polyol.

Prior to shooting the system, the mold was prepared by paste waxing both the upper and lower inner surface cavities with Chemtrend LH-1 and subsequently sprayed with PRC-797, an external mold release available from Chem-Trend. The system was shot into a closed mold and demolded after 45 seconds. Releasability from the mold was determined by ease of release from the bottom half of the mold. Thus, the upper mold half was sprayed with external mold release prior to each shot; but the lower mold half was left undisturbed. The number of releases from the lower mold half without having to reapply external mold release was measured along with a qualitative determination of ease of relief. A failure in release is indicated if the part deforms even slightly as the part is being taken out of the bottom mold half.

The results of the trial indicated that Plaques 1-10 demolded easily with minimal effort, Plaques 11-16 demolded with a medium pull, and Plaques 17-31 also demolded but with a harder pull. However, no parts deformed upon demolding; and it appeared that the parts would continue to demold indefinitely without failure in release.

EXPERIMENT 8

A machine run sample using Iso Sample 2 was trialed with a BDO extended system in the same mold and using the same release procedure as in Experiment 7. The polyol composition was 71.7849 weight percent Polyol A, 8.5288 weight Polyol B, 13.2692 weight percent BDO, 0.4400 weight percent R-8020, 0.0348 weight percent T-12, 19423 PPK, 1.0 weight percent DC-1248, and 3.0 weight percent DA-4. The ratio used was 69.8 Iso/100 Polyol composition with the Iso temperature at 100° F. and pressure at 2,400 psi, the Polyol composition temperature at 100° F. and pressure at 2,450 psi, and injected at a rate of 1.75 lb./sec. into the aluminum mold preheated to 170° F.

The results were similar to the DETDA extended system with parts 1-7 being very easy to pull (almost sliding out of the mold), 8-13 requiring little effort to pull, and parts 14-40 releasing with a harder yank but none sticking or exhibiting deformation upon pull.

What we claim is:

1. A mold release composition comprising a fatty prepolymer having a terminal fatty chain attached directly or indirectly to a urethane linkage, an oxazolidinone linkage, or a urea linkage; wherein, when said linkage is a urethane linkage, the fatty prepolymer is obtained by reacting an organic polyisocyanate with a terminal fatty chain-containing molecule, said molecule being an aliphatic molecule having an isocyanate-reactive functionality selected from the group consisting of a primary hydroxyl functionality and a secondary hydroxyl functionality; wherein, when said linkage is an oxazolidinone linkage, the fatty prepolymer is obtained by reacting an organic polyisocyanate with a terminal fatty chain-containing molecule having an epoxide functionality; wherein, when said linkage is a urea linkage, the fatty prepolymer is obtained by reacting an organic polyisocyanate with a terminal fatty chain-containing molecule having a primary amine functionality or a secondary amine functionality; and wherein said terminal fatty chain-containing molecule in each case has a terminal fatty chain comprising from 8 to 24 hydrogen substituted, branched or unbranched, aliphatic carbon atoms in succession or 5 to 24 perfluorinated branched or unbranched carbon atoms in succession; and wherein the terminal fatty chain-containing molecule has a molecular weight of less than 500.

2. The composition of claim 1, wherein each of said organic polyisocyante comprises an aromatic organic polyisocynate, and said terminal fatty chain comprises saturated bonding or unsaturated bonding of one or more double bonds.

3. The composition of claim 2, wherein greater than zero to 10 weight percent of said fatty chain-containing molecule having the isocyanate-reactive functionality or a primary amine functionality is reacted with from 90 weight percent to less than 100 weight percent of an aromatic organic polyisocyanate.

4. The composition of claim 2, wherein from 1 weight percent to 5 weight percent of said fatty chain-containing molecule having the isocyanate-reactive functionality or a primary amine functionality is reacted with from 95 weight percent to 99 weight percent of an aromatic organic polyisocyanate.

5. The composition of claim 2, wherein the free NCO content of the mold release composition is from 0 weight percent to less than 17 weight percent.

6. The composition of claim 2, wherein each of said organic polyisocyanates is a urethane-modified diphenylmethane diisocyanate obtained by reacting a polyol having a molecular weight of less than 500 with 4,4'-diphenylmethane diisocyanate.

7. The composition of claim 6, wherein the linkage is a urethane linkage, said isocyanate-reactive functionality is a primary hydroxyl functionality, and the terminal fatty chain consists of from 8 to 18 hydrogen substituted aliphatic carbon atoms in succession.

8. The composition of claim 7, wherein from 1 weight percent to 3 weight percent of the terminal fatty chain-containing molecule is reacted with from 97 weight percent to 99 weight percent of the urethane-modified diphenylmethane diisocyanate to obtain a mold release composition having a free NCO content of from about 20 weight percent to 25 weight percent.

9. The composition of claim 6, wherein the isocyanate-reactive functionality is a primary hydroxyl group and the terminal fatty chain comprises 6 to 8 perfluorinated carbon atoms in succession.

10. The composition of claim 6, wherein the terminal fatty chain-containing molecule has a primary amine functionality and a fatty chain comprising from 8 to 22 aliphatic hydrogen substituted carbon atoms in succession.

11. The composition of claim 10, wherein the terminal fatty chain-containing molecule further contains one or more ether groups.

12. The composition of claim 11, wherein from 1 weight percent to 3 weight percent of the terminal fatty chain-containing molecule is reacted with 97 weight percent to 99 weight percent of said organic polyisocyanate to obtain a mold release composition having from 17 weight percent to 23 weight percent free NCO groups.

13. The composition of claim 12, wherein the fatty chain-containing molecules comprise a mixture of 12-15 carbon atom molecules.

14. The composition of claim 2, wherein the organic polyisocyanate in each case is a uretonimine-carbodiimide modified 4,4'-diphenylmethane diisocyanate comprising from 10 weight percent to 35 weight percent uretonimine-carbodiimide group containing modified 4,4'-diphenylmethane diisocyanate and from 65 weight percent to 90 weight percent diphenylmethane diisocyanate.

15. The composition of claim 14, wherein the linkage is a urethane linkage, said isocyanate-reactive functionality or a primary hydroxyl functionality, and the terminal fatty chain comprises from 8 to 18 hydrogen-substituted aliphatic carbon atoms in succession.

16. The composition of claim 15, wherein from 1 weight percent to 3 weight percent of the fatty chain-containing molecule is reacted with from 97 weight percent to 99 weight percent of the urethane-modified diphenylmethane diisocyanate to obtain a mold release composition having a free NCO content of from about 20 weight percent to 25 weight percent.

17. The composition of claim 14, wherein the terminal fatty chain has from 5 to 18 perfluorinated carbon atoms in succession.

18. A mold release composition comprising a fatty modified organic polyisocyanate having a terminal fatty chain attached directly or indirectly to a linkage selected from the group consisting of an allophanate linkage, a biuret linkage, and a uretonimine-carbodiimide linkage; wherein, when the linkage is said allophanate linkage, the fatty modified organic polyisocyanate is obtained by reacting an organic polyisocyanate with a terminal fatty chain-containing molecule having an isocyanate-reactive functionality selected from the group consisting of a primary hydroxyl functionality and a secondary hydroxyl functionality; wherein, when said linkage is a biuret linkage, the fatty organic polyisocyanate is obtained by reacting an organic polyisocyanate with a terminal fatty chain-containing molecule having one primary amine functionality; wherein, when the linkage is said uretonimine-carbodiimide linkage, the fatty modified organic polyisocyanate is obtained by reacting an organic polyisocyanate with a terminal fatty chain-containing molecule having one isocyanate group; and wherein said terminal fatty chain-containing molecule in each case has a terminal fatty chain comprising from 8 to 24 hydrogen substituted branched or unbranched aliphatic carbon atoms in succession or 5 to 24 successive perfluorinated branched or unbranched carbon atoms, and wherein the terminal fatty chain-containing molecule in each case has a molecular weight of less than 500.

19. The mold release composition of claim 18, wherein each of the said organic polyisocyanate comprises an organic aromatic polyisocyanate, and said terminal fatty chain comprises saturated bonding or unsaturated bonding of one or more double bonds.

20. The mold release composition of claim 19, wherein said composition comprises a blend of greater than zero to 10 weight percent of said fatty modified organic polyisocyanate and from 90 weight percent to less than 100 weight percent of diphenylmethane diisocyanate, uretonimine-carbodiimide modified diphenylmethane diisocyanate, urethane modified diphenylmethane diisocyanate, or mixtures thereof.

21. The mold release composition of claim 19, wherein any one of said organic aromatic polyisocyanates comprise 4,4'-diphenylmethane diisocyanate, urethane modified 4,4'-diphenylmethane diisocyanate, or mixtures thereof.

22. The mold release composition of claim 19, wherein said fatty modified organic polyisocyanate contains allophanate linkages obtained by reacting in the presence of an allophanate promoting catalyst at temperatures of from 95° C. to 130° C.:
   a) the reaction product of said terminal fatty chain-containing molecule having said isocyanate reaction functionality and 4,4'-diphenylmethane diisocyanate at temperatures of from 45° C. to 80° C.; with
   b) further 4,4'-diphenylmethane diisocyanate.

23. The mold release composition of claim 22, wherein said isocyanate-reactive functionality is a primary hydroxyl functionality.

24. The mold release composition of claim 23, wherein the said terminal fatty chain comprises from 8 to 24 hydrogen substituted, branched or unbranched, aliphatic carbon atoms in succession.

25. The mold release composition of claim 19, wherein the said terminal fatty chain comprises from 8 to 24 hydrogen substituted, branched or unbranched, aliphatic carbon atoms in succession.

26. The mold release composition of claim 19, wherein the fatty modified organic polyisocyanate contains biuret linkages obtained by reacting at temperatures of from 80° C. to 150° C., optionally in the presence of a biuret promoting catalyst; said organic polyisocyanate with said primary amine functionality on the terminal fatty chain-containing molecule; said terminal fatty chain comprising from 8 to 24 hydrogen substituted, branched or unbranched, aliphatic carbon atoms in succession.

27. The mold release composition of claim 26, wherein the terminal fatty chain is saturated and has from 8 to 15 hydrogen substituted aliphatic carbon atoms, and wherein said terminal fatty chain-containing molecule has at least one ether linkage between the amine functionality and the terminal fatty chain.

28. The mold release composition of claim 27, wherein said terminal fatty chain-containing molecule comprises from 12 to 15 unbranched carbon atoms, and wherein the organic aromatic polyisocyanate is 4,4'-diphenylmethane diisocyanate.

29. The mold release composition of claim 26, wherein from 1 weight percent to 6 weight percent of the terminal fatty chain-containing molecule are reacted with from 94 weight percent to 99 weight percent of the organic polyisocyanate.

30. The mold release composition of claim 19, wherein the fatty modified organic polyisocyanate contains uretonimine-carbodiimide linkages obtained by reacting in the presence of a carbodiimide promoting catalyst at temperatures of from 90° C. to 150° C. an organic aromatic polyisocyanate with said isocyanate functionality on the terminal fatty chain-containing molecule, deactivating said carbodiimide promoting catalyst, and letting the temperature cool to room temperature to promote the formation of uretonimine, wherein the terminal fatty chain of said terminal fatty chain-containing molecule having an isocyanate functionality comprises from 8 to 24 hydrogen substituted, branched or unbranched, aliphatic carbon atoms.

31. The mold release composition of claim 30, wherein from 1 weight percent to 15 weight percent of the terminal fatty chain-containing molecule having an isocyanate functionality is reacted with 85 weight percent to 99 weight percent of the organic aromatic polyisocyanate.

32. A reaction injection molded article obtained by reacting an organic polyisocyanate fatty prepolymer with a polyol composition, said organic polyisocyanate fatty prepolymer comprising the reaction product of an organic polyisocyanate and a terminal fatty chain-containing molecule having an isocyanate-reactive functionality selected from the group consisting of a primary hydroxyl functionality, a secondary hydroxyl functionality, an epoxide functionality, a primary amine functionality, and a secondary amine functionality, said terminal fatty chain-containing molecule having a terminal fatty chain comprising from 8 to 24 hydrogen substituted, branched or unbranched, aliphatic carbon atoms in succession or 5 to 24 perfluorinated, branched or unbranched, carbon atoms in succession; said terminal fatty chain-containing molecule having a molecular weight of less than 500.

33. The molded article of claim 32, wherein said organic polyisocyanate comprises an aromatic polyisocyanate and said terminal fatty chain comprising saturated bonding or unsaturated bonding of one or more double bonds.

34. The molded article of claim 33, wherein the prepolymer has a free NCO content of from 17 weight percent to 32 weight percent.

35. The molded article of claim 34, wherein the prepolymer has a free NCO content of from 19 weight percent to 26 weight percent.

36. The molded article of claim 34, wherein the prepolymer is obtained by reacting an organic polyisocyanate with said molecule having a primary hydroxyl functionality or a secondary hydroxyl functionality to form urethane linkage.

37. The mnolded article of claim 34, wherein the prepolymer is obtained by reacting said molecule with a primary amine functionality or a secondary amine functionaity to form a urea linkage.

38. The molded article of claim 34, wherein the prepolymer is obtained by reacting an organic polyisocyanate with said molecule having an epoxide linkage to form an oxazolidinone linkage.

39. A reaction injection molded article obtained by reacting a fatty modified organic polyisocyanate with a polyol composition, said fatty modified organic polyisocyanate comprising the reaction product of an organic polyisocyanate and a terminal fatty chain-containing molecule having a primary hydroxyl functionality, a secondary hydroxyl functionality, a primary amine functionality, a secondary amine functionality, or an isocyanate functionality, wherein the organic polyisocyanate and the terminal fatty chain-containing molecule react to produce an allophanate linkage, a biuret linkage, or a carbodiimide-uretonimine linkage, said terminal fatty chain-containing compound having a terminal fatty chain comprising from 8 to 24 hydrogen substituted, branched or unbranched, aliphatic carbon atoms or 5 to 24 perfluorinated, branched or unbranched, carbon atoms in succession, and wherein said terminal fatty chain-containing molecule has a molecule weight of less than 500.

40. The molded article of claim 39, wherein said organic polyisocyanate comprises an aromatic organic polyisocyanate and said terminal fatty chain comprising saturated bonding or unsaturated bonding of one or more double bonds.

41. The molded article of claim 40, wherein the fatty modified organic polyisocyanate has a free NCO content of from 0 weight percent to less than 17 weight percent.

42. The molded article of claim 40, wherein the linkage is an allophanate linkage, and the functionality is a primary hydroxyl functionality.

43. The molded article of claim 40, wherein the linkage is a biuret linkage, and the functionality is a primary amine functionality.

44. The molded article of claim 40, wherein the linkage is a carbodiimide-uretonimine linkage.

45. The molded article of claim 40, wherein the polyol composition contains a polyhydroxyl chain extender.

46. The molded article of claim 40, wherein the polyol composition contains diethylene toluenediamine as a chain extender.

47. A process for making a mold release composition, comprising reacting a terminal fatty chain-containing molecule having a primary hydroxyl functionality, a secondary hydroxyl functionality, a primary amine functionality, a secondary amine functionality, an epoxide functionality, or an isocyanate functionality, with an organic polyisocyanate; wherein when said functionality is a primary hydroxyl or a secondary hydroxyl, the organic polyisocyanate reacts to form a urethane linkage or an allophanate linkage; wherein when said functionality is a primary amine functionality or a secondary amine functionality, the organic polyisocyanate reacts to form a urea linkage or a biuret linkage; wherein when said functionality is an epoxide functionality, the organic polyisocyanate reacts to form an oxazolidinone linkage; wherein when said functionality is an isocyanate functionality, the organic polyisocyanate reacts to form a carbodiimide-uretonimine linkage; wherein said terminal fatty chain-containing molecule has a terminal fatty chain comprising from 8 to 24 hydrogen substituted, branched or unbranched, aliphatic carbon atoms in succession or 5 to 24 perfluorinated, branched or unbranched, carbon atoms in succession; and wherein the terminal fatty chain-containing molecule has a molecular weight of less than 500.

48. The process of claim 47, wherein said organic polyisocyanate comprises an organic aromatic polyisocyanate and said terminal fatty chain comprises saturated bonding or unsaturated bonding of one or more double bonds.

49. The process of claim 48, wherein from one (1) weight percent to five (5) weight percent of said molecule is reacted with from a 5 weight percent to 99 weight percent of an aromatic organic polyisocyanate.

50. The process of claim 48, wherein the free NCO cntent of the mold release composition is from 0 weight percent to less than 17 weight percent.

51. The process of claim 48, wherein said terminal fatty chain consists of 8 to 18 hydrogen substituted aliphatic carbon atoms in succession.

52. The process of claim 51, wherein the molecule has a primary hydroxyl functionality, a primary amine functionality, or an isocyanate functionality.

53. The process of claim 52, wherein the organic modified polyisocyanate comprises a urethane modified 4,4'-diphenylmethane diisocyanate or a carbodiimide-uretonimine modified 4,4'-diphenylmethane diisocyanate.

54. The process of claim 48, wherein the organic polyisocyanate comprises 4,4'-diphenylmethane diisocyanate.

* * * * *